Figure 1:
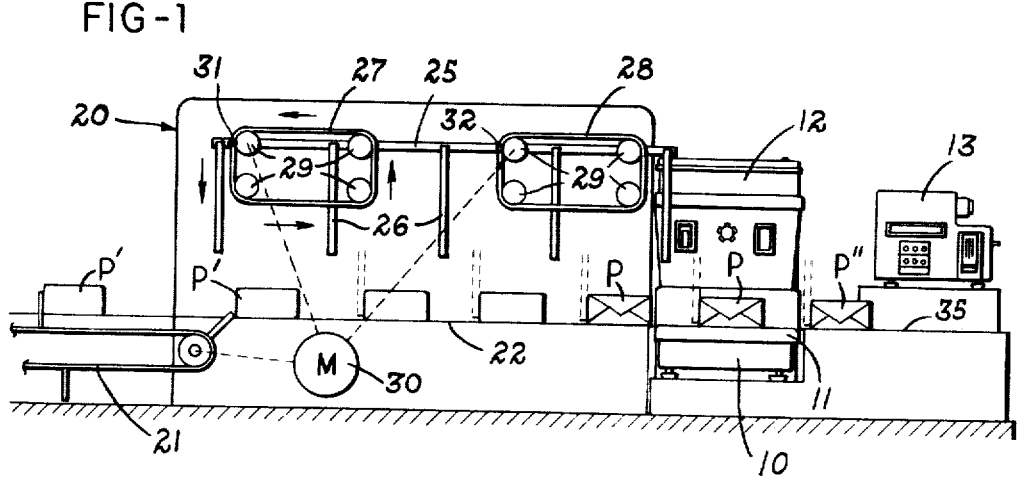

April 16, 1963 K. C. ALLEN 3,085,640

AUTOMATIC CONVEYOR AND WEIGHING SCALE SYSTEM

Filed May 22, 1959

INVENTOR.
KENNETH C. ALLEN
BY
ATTORNEYS

3,085,640
Patented Apr. 16, 1963

3,085,640
AUTOMATIC CONVEYOR AND WEIGHING SCALE SYSTEM
Kenneth C. Allen, Dayton, Ohio, assignor to The Hobart Manufacturing Company, Troy, Ohio, a corporation of Ohio
Filed May 22, 1959, Ser. No. 815,048
3 Claims. (Cl. 177—3)

This invention relates to weighing scales and weighing systems.

The invention relates more particularly to weighing systems which include not only a scale for weighing each load but also a register or other means for recording the individual weights of the weighed loads, and which in addition may perform other operations, such for example as computing the value of the load and/or printing a record of data relevant to the load, such as weight, value, unit price and/or the nature of the commodity constituting the load. The invention is especially relevant to weighing systems of this type which are used for weighing a series of successive packages or other articles of food or other commodity and for recording the weights of such articles, as by printing a suitable ticket or other permanent record.

The invention has special application to weighing systems of the type noted above which also include some form of conveyor arrangement to deliver successive articles to the platter of the scale for weighing and then to replace the weighed article by the next article to be weighed. In particular, the invention is concerned with such systems wherein the scale cooperates automatically with a register or other means for recording the individual weight in response to establishment of the balance position of the scale for each load. For example, a weighing system of this character is especially well adapted for use in conjunction with a wrapping machine for packages of food, to weigh the successive wrapped packages and to record the weight thereof as by means of appropriate individual labels or other record.

In a weighing system as outlined above, if the weighing and recording operations are to be carried out at maximum speed, the conveyor should operate at a sufficiently high rate to replace each weighed article with a new article as soon as possible after the weight of the previously weighed load has been transmitted to the recording means. There may be occasions, however, when delays occur in the operation of the scale, for example, if one load is considerably heavier or lighter than the immediately previous load, or if an error has occurred in the operation of the recording means. Unless provision is made for controlling the delivery of the successive loads to the scale in accordance with the ability of the scale and recorder to handle them, confusion can quickly develop.

It is a primary object of the present invention to provide a weighing system of the general characteristics outlined above which includes means for conveying successive articles to and from the scale, means responsive to the weighing action of the scale for recording the weight of each weighed article, and means for controlling the action of the conveyor in relation to the action of the scale and recorder in such manner that the successive articles may be delivered to the scale as fast as the scale is able to handle them but whenever a delay occurs in the weighing operation, replacement of the article being weighed is correspondingly delayed.

An additional object of the invention is to provide such a weighing system wherein the cooperative action of the scale and recorder controls the operation of the conveyor delivering the successive articles to the scale in such manner that the conveyor is delayed by stopping or retarding whenever it is running too fast for the weighing or recording operation but is caused to resume proper speed as soon as the scale and recorder are ready therefor.

Another complication which sometimes arises in the operation of a weighing system of the character outlined above is that the exchange of articles on the scale platter by the conveyor takes place in such manner that the platter remains in substantially unmoved position. This is important when the weighing system includes provision for preventing recycling of the recorder for the same weighed load, as by requiring total removal of the load from the platter or displacement of the platter through a considerable distance before a new weighing and recording cycle can begin. Under such conditions it would be possible for a package or other articles to move across the platter without weighing and/or recording.

It is therefore another object of the invention to provide a weighing system which includes a scale and recording means having a non-repeat control wherein the operation of the associated conveyor in replacing a weighed load with a new load automatically causes resetting of the system for a new weighing and recording cycle even if the platter does not move sufficiently during the exchange of loads thereon to release the non-repeat control.

Further objects and advantages of the invention will be apparent from the following description, the accompanying drawings and the appended claims.

In the drawings—

Figure 2:
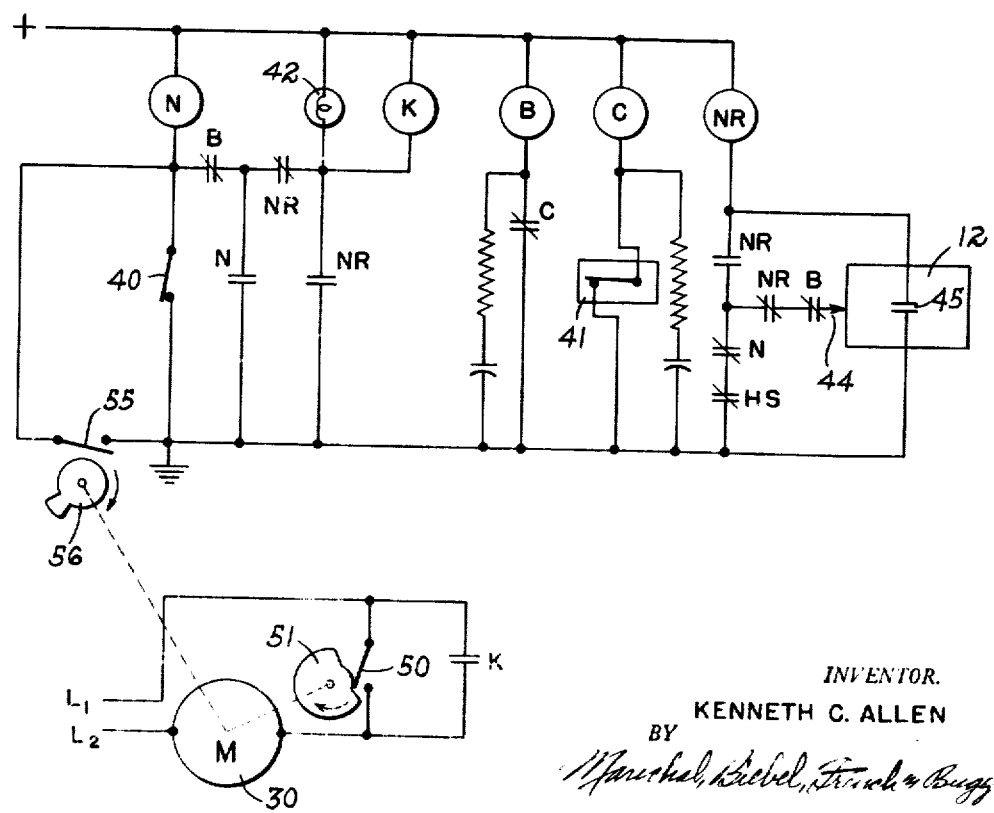

FIG. 1 is a somewhat diagrammatic view in elevation showing a weighing system in accordance with the invention which is incorporated with a wrapping machine and includes a conveyor for delivering the successive wrapped packages to and from the scale platter; and FIG. 2 is a schematic wiring diagram in accordance with the invention for the wrapping and weighing system of FIG. 1.

Referring to the drawing, which illustrates a preferred embodiment of the invention, the weighing system in FIG. 1 is illustrated as incorporating many of the characteristics disclosed in a series of copending applications identified as cases A to D inclusive in accordance with the index table at the end of this specification, all of which are assigned to the assignee of the present application. This system includes a power operated scale indicated generally at 10 and having a platter 11 which receives the package or other article to be weighed.

The weighing mechanism of scale 10 cooperates with a computing apparatus, represented generally in FIG. 1 by the housing 12, to read out the total weight of each load in terms of pounds and suitable fractions of a pound, and the computer 12 also computes the value of a load in accordance with a preset price per pound. The scale 10 and computer 12 are interconnected with a register-printer indicated generally at 13, a detailed description of which is found in part in case A and also in case C. The register-printer 13 is constructed for cooperation with the scale and computer to print and issue successive printed tickets showing the weight and the unit price and value of each load wieghed by the scale as described in case A and case B.

The remainder of the system shown in FIG. 1 includes a machine indicated generally at 20 for wrapping successive packages P to be delivered to the scale platter 11 for weighing and recording purposes, and since the details of the wrapping machine 20 are not related to the present invention, the showing of this machine in FIG. 1 is diagrammatic. It includes a feed table and conveyor 21 for delivering successive unwrapped packages P to a table or track 22 along which these packages move during the successive stages of the wrapping operation. This feeding movement of the packages is effected by a conveyor shown as comprising a bar 25 from which depend a plurality of pusher members 26. The bar 25 is in turn supported by a plurality of drive chains 27 and 28 each trained around four supporting sprockets 29 and driven by a common drive motor 30, which also drives the conveyor 21 in properly timed relation with the conveyor bar 25.

The conveyor bar 25 is provided with pivotal supports 31 and 32 on the chains 27 and 28 respectively so that as these chains move in counterclockwise direction as viewed in FIG. 1, the pusher members 26 move translationally along an essentially rectangular path providing four strokes, namely a forward feeding stroke to the right in FIG. 1, an upward stroke at the end of the feeding stroke, a return stroke, and a downward stroke. These movements and the proportions of the conveyor parts are coordinated with the positioning of the scale 10 with respect to the wrapping machine 20 in such manner that during each complete cycle of the conveyor, the package on the scale platter is weighed, its weight is recorded in the register-printer 13, and it is replaced by a new package. The weighed package P″ is shown in FIG. 1 as being delivered from the platter 11 to the top of a table 35 which supports the scale and the register-printer, and in the normal use of this system as shown, an operator will be stationed at this table to pick up the successive weighed packages and to effect application of the ticket thereto from the register-printer as described in case B.

As previously noted, the invention is concerned with preventing the exchange of packages on the scale platter 11, i.e. before the scale has completed its weighing operation on the previous package. There are a number of possible sources of delay at the scale which could result in such premature exchange of packages unless adequate provision were made, such for example as the presence of successive packages which are of substantially different weights, in which event a delay would occur because of the increased time which would be required for movement of the weighing mechanism of the scale to a new balance position. Similarly a delay would occur in the event of an error in the operation of the computer, which would cause the entire weighing system to stop as described in case C. Another possible source of delay would be failure or slowness on the part of the operator in removing the previously printed ticket from the register 13, which would similarly block further operation of the system as described in cases B and C.

FIG. 2 illustrates control circuits constituting an embodiment of the invention which successfully prevents premature delivery of a package to the scale platter 11 as described above, and a substantial number of the component parts in this wiring diagram correspond to parts shown in the wiring diagrams of case C and case D. The several switches and relays are shown in the positions they occupy when the scale has been turned on by the main switch (not shown) but with no load on the platter.

In FIG. 2, the switch 40, which is the no-load switch corresponding to switch 55 of case C, is closed by upward movement of the platter when there is no load thereon. Similarly since the weighing mechanism is at balance in its zero position, the control relay C is closed through the sensing switch which is shown diagrammatically at 41 and is preferably of the construction shown in my United States Patent 2,873,416 issued February 10, 1959. The no-load relay N is closed through the switch 40 and locked in through the back contacts of the balance relay B, and the signal light 42 is lighted through the back contacts of the non-repeat relay NR and the locking contacts of relay N. The light 42 is the signal light which is also indicated in FIG. 1 as notifying the operator during manual use of the scale that the scale has completed its weighing operation on one load and is ready for replacement thereof. It will be noted that the relay K is closed through the same circuits as the signal light 42, and its function will be described hereinafter.

In the normal operation of the scale as described in cases C and D, when the platter 11 is displaced by application of a load, the no-load switch 40 and sensing switch 41 both open, and the relay C therefore opens after a fractional second delay due to the condenser and resistor in its direct connection to ground. Opening of relay C causes relay B to close through the back contacts of relay C, and this in turn will cause relay N to open, thereby breaking the energizing circuit through its locking contacts for the signal light 42 and causing the latter to go out and the relay K to open.

These conditions will continue without affecting any of the other parts in the wiring diagram until the scale comes to balance, except that if the displacement of the platter has been substantial, the back contacts HS will open owing to the closing of their associated relay in the control circuits for the scale motor which causes the motor to operate at high speed, this being the relay 67 in case D. At the balance position, the closing of the switch 41 will reestablish the energizing circuit for the relay C. The resulting opening of its back contacts in the energizing circuit for relay B will cause the latter to open after the short time delay established by the condenser and resistor in its connection to ground to assure that the scale will be accurately in balance before subsequent operations take place.

Opening of relay B applies a ground through its back contacts, the reclosed contacts HS and the back contacts of relays N and NR to a line 44 leading to the computer 12, and this initiates the computing operation as described in case C. As also described in that application, operation of the computer temporarily closes a pair of normally open relay contacts 45 to complete an energizing circuit for relay NR, which closes and locks itself in as shown, thereby breaking the ground connection for line 44 to prevent recycling of the computer and register-printer before another weighing operation.

When this point in the operating cycle has been reached, the light 42 is relighted through the front contacts of relay NR to signal that the weighed load can now be removed from the platter and replaced by a new load. If the load is removed completely, the platter will immediately return to its no-load position, thereby reclosing switch 40 and relay N. This will in turn open relay NR and temporarily break the energizing circuit for signal light 42, but the latter will be immediately relighted through the back contacts of relay NR and the locking contacts of relay N. Relay K will operate similarly to the signal light 42 and therefore still be closed.

In the normal operation of the entire system including the wrapping machine 20, the speed of the conveyor is correlated with that of the scale and its associated recording means to exchange packages on the platter 11 at substantially the same or a slightly slower rate than the rate at which the scale can operate. In other words, successive packages are delivered to the platter substantially as fast as the signal light is relighted following completion of each weighing operation as described. If, however, there is any delay in the relighting of the light 42, an exchange of packages would take place prematurely, and the invention is directed to the prevention of such premature exchange of packages by correspondingly delaying operation of the conveyor.

Referring to FIG. 2, the power for operation of the wrapping machine motor M is shown as supplied by lines $L_1$ and $L_2$, and line $L_1$ is shown as including front contacts of relay K. In addition, the line $L_1$ includes a switch 50 connected in parallel with the relay contacts K and cooperating with a cam 51 driven from the motor 30. The switch 50 and cam 51 may operate in any suitable way to introduce a controlled delay in the operation of motor 30 and/or conveyor bar 25, and the arrangement is shown as such that the switch is open during a predetermined portion of a complete cycle of the conveyor, preferably that portion of the cycle when the bar 25 is executing its downward stroke as described.

With this circuit arrangement, if the weighing and recording operations have proceeded at normal speed during each cycle, the light 42 will be relighted and the relay K will be reclosed before the conveyor bar 25 reaches the end of its return stroke. The relay contacts K will therefore be closed, the supply of power to the motor 30 will remain unbroken, and the conveyor will continue to operate at normal speed. If, however, there has been a delay in the operation of the weighing and recording system, relay K will be open when the conveyor bar 25 begins its downward stroke, since the switch 50 will then also be opened through operation of the cam 51, the motor 30 will be shut off while the conveyor bar 25 coasts through its downward stroke. No exchange of packages will therefore take place until correction of whatever condition caused the delay in the reclosing of relay K, whereupon motor 30 will be re-started through the closed front contacts of relay K and the operations will proceed.

The invention also is concerned with the fact that with the circuit arrangement of FIG. 2, the computer and register-printer are blocked against recycling unless the load is temporarily removed from the platter 11 to cause switch 40 to close, or the load on the platter is changed substantially to displace the platter through a sufficient distance to effect closing of the high speed relay associated with the contacts HS in FIG. 2 as described in case D. Neither of these conditions would occur if successive packages are of substantially the same weight and are exchanged on the platter in such manner that its position does not change sufficiently to close the high speed relay, which preferably requires a weight change of at least approximately .30 pound as described in case D. Also, since this would produce a circuit condition retaining relay K closed through the closed front contacts of relay NR, the motor 30 and conveyor bar 25 will continue running but the new package on the platter will not be weighed or recorded. Furthermore, this is true even though the sensing switch 41 will open long enough to drop out relay C, since that switch is so sensitive as to detect variation in weight of less than .010 pound by opening if the platter moves as little as .0001 inch, and it would be a practical impossibility to avoid this little movement during exchange of packages on the platter.

The invention provides a solution for this possible error condition by means of a mechanical switch 55 connected in parallel with the no-load switch 40 and normally open. This switch 55 cooperates with a cam 56 which is also driven from the motor 30 and is constructed and arranged to close the switch 55 momentarily during a portion of the advancing stroke of the conveyor 25 which effects exchange of packages on the scale platter 11. With this arrangement, the momentary closing of switch 55 while the exchange of packages is taking place will effect closing of relay N, thereby opening its back contacts in the locking circuit for relay NR. Relay NR therefore opens and remains open, and since relay C has also opened to effect closing of relay B, relay N cannot lock itself in and reopens as soon as cam 56 releases switch 55. Therefore as soon as relay C recloses to reopen relay B, the ground connection through line 44 to the computer 12 will again be complete to send the starting signal for recording the weight of the new load.

The invention accordingly provides a weighing and recording system in combination with a conveyor for delivering and removing successive articles to be weighed which offers maximum advantages of speed and accuracy, and which especially offers maximum assurance against premature exchange of articles on the scale as well as against the possibility of failure to weigh and record the weight of any package. While the invention has been described in conjunction with a wrapping machine, in view of its particular utility therewith, it is not limited thereto and is equally applicable to many other installations involving the weighing and recording of the weight of packages or other articles. It is similarly not limited to use with a computing scale, nor with the particular type of register-printer shown in the drawing, and it will be apparent that it offers equal advantages in conjunction with automatic labeling machines as well as with recording units of any other type.

While the form of apparatus herein described constitutes a preferred embodiment of the invention, it is to be understood that the invention is not limited to this precise form of apparatus, and that changes may be made therein without departing from the scope of the invention which is defined in the appended claims.

*Index Table of Copending Applications*

| Case | Inventor | Serial No. | Patent No. | Filing Date |
|------|----------|------------|------------|-------------|
| A | Kenneth C. Allen | 548,148 | 2,948,465 | November 21, 1955. |
| B | Kenneth C. Allen and David A. Meeker. | 561,336 | 2,948,466 | January 25, 1956. |
| C | Kenneth C. Allen | 637,725 | | February 1, 1957. |
| D | ____do____ | 637,756 | 2,921,780 | February 1, 1957. |

What is claimed is:

1. A conveyor and automatic weighing scale system for weighing a plurality of articles in succession on the platform of an automatic scale including a cyclically operable conveyor having article handling means arranged to move a succession of said articles onto the scale platform and means for recording the weight of each said article and printing a record thereof, the improvement comprising normally continuously running conveyor drive means for operating said conveyor, sensing means responsive to said scale in balance with a load thereon or, alternatively, to an unbalanced condition of said scale indicative of the presence of an unweighed load on said platform, cycling control switch means for said drive means operable in synchronism with said conveyor for energizing said drive means and operable to deenergize said drive means prior to the end of its cycle, second switch means connected in parallel with said cycling control switch means operated by said sensing means to energize said conveyor drive means independently of said cycling control switch means for continuing said drive means in operation except when there is an unweighed load on said platform, and no load sensing means for actuating said second switch means in the absence of a further load on said platform.

2. A conveyor and automatic weighing and computing scale system including a cyclically operable conveyor for delivering a plurality of articles in succession to the scale platform, a computer for computing the value of each weighed article and means for recording the computed value, the improvement comprising, normally continuously running conveyor drive means connected in driving relation to said conveyor, sensing means responsive to said scale in balance condition and consequent operation of said computer or, alternatively, to an unbalanced condition of said scale and non-operation of said computer indicative of the presence of an unweighed load on said platform, means operable in synchronism with said conveyor, a conveyor drive energizing circuit having first switch means operable by said synchronous means in a cycle of operation correlated with the movement of said conveyor for holding said drive means in energized condition throughout the major portion of said cycle, said first switch means being operable with said conveyor drive means to a position to deenergize said drive means during the minor portion of said cycle, second switch means connected to said circuit in parallel with said first switch means for energizing and maintaining said drive means in operating condition independently of said first switch means, means controlled by said sensing means when said scale is in balance for actuating said second switch means to thereby maintain said conveyor in continuously operating condition as long as each weighing operation is completed at or prior to the termination of said major portion of said cycle, and no load sensing means for actuating said second switch means in the absence of a further load on said platform.

3. A conveyor and automatic weighing and computing scale system including a cyclically operable conveyor for delivering a plurality of articles in succession to the scale platform, a computer for computing the value of each weighed article and means for recording the computed value, the improvement comprising, normally continuously running conveyor drive means connected in driving relation to said conveyor, sensing means responsive to said scale in balance condition and consequent operation of said computer or, alternatively, to an unbalanced condition of said scale and non-operation of said computer indicative of the presence of an unweighed load on said platform, a cam operable in synchronism with said conveyor, a conveyor drive energizing circuit having a cam-operated switch operable by said cam in a cycle of operation for holding said drive means in energized condition throughout the major portion of said cycle and operable to a position to deenergize said drive means during the minor portion of said cycle, switch means connected to said circuit in parallel to said cam-operated switch for energizing and maintaining said drive means in operating condition independently of said cam-operated switch, and means controlled by said sensing means when said scale is in balance for actuating said switch means to thereby maintain said conveyor in continuously operating condition and being effective to actuate said switch means when the scale is unbalanced with an unweighed load on said platform.

References Cited in the file of this patent
UNITED STATES PATENTS

| | | |
|---|---|---|
| 1,690,679 | Hebden | Nov. 6, 1928 |
| 1,757,072 | Boyer | May 6, 1930 |
| 2,116,895 | Howard | May 10, 1938 |

UNITED STATES PATENT OFFICE
CERTIFICATE OF CORRECTION

Patent No. 3,085,640                              April 16, 1963

Kenneth C. Allen

It is hereby certified that error appears in the above numbered patent requiring correction and that the said Letters Patent should read as corrected below.

Column 4, line 5, for "displayed" read -- displaced --; line 68, for "a ssupplied" read -- as supplied --; column 8, line 14, for "effective" read -- ineffective --.

Signed and sealed this 5th day of November 1963.

(SEAL)
Attest:

ERNEST W. SWIDER
Attesting Officer

EDWIN L. REYNOLDS
Acting Commissioner of Patents